(12) United States Patent
Günther (10) Patent No.: US 6,897,418 B1
(45) Date of Patent: May 24, 2005

(54) TEMPERATURE SENSOR AND HEATING DEVICE FOR HOT RUNNER SYSTEMS

(75) Inventor: Herbert Günther, Allendorf (Eder) (DE)

(73) Assignee: Gunther GmbH & Co. Metallverarbeitung, Frankenberg (DE)

( * ) Notice: Subject to any disclaimer, the term of this patent is extended or adjusted under 35 U.S.C. 154(b) by 118 days.

(21) Appl. No.: 10/618,662

(22) Filed: Jul. 15, 2003

(30) Foreign Application Priority Data

Jul. 26, 2002 (DE) ..................... 202 11 328 U (51) Int. Cl.[7] .................................. H05B 3/06
(52) U.S. Cl. ............. 219/543; 219/424; 219/426; 425/549; 425/572
(58) Field of Search ................ 219/543, 209, 219/534, 539, 548; 338/292, 294, 283, 306–309; 425/549, 572

(56) References Cited

U.S. PATENT DOCUMENTS

| | | | | |
|---|---|---|---|---|
| 5,202,665 A | * | 4/1993 | Hafele ..................... | 338/25 |
| 5,332,991 A | * | 7/1994 | Kojima et al. ............ | 338/25 |
| 5,406,246 A | * | 4/1995 | Friese et al. ............. | 338/22 R |
| 5,436,494 A | * | 7/1995 | Moslehi ................... | 257/467 |
| 5,973,296 A | * | 10/1999 | Juliano et al. ........... | 219/424 |
| 6,022,210 A | * | 2/2000 | Gunther ................... | 425/549 |
| 6,140,906 A | * | 10/2000 | Kaihara et al. .......... | 338/22 R |
| 6,287,439 B1 | * | 9/2001 | Kato et al. ................ | 204/425 |
| 6,805,549 B2 | * | 10/2004 | Günther .................. | 425/549 |

FOREIGN PATENT DOCUMENTS

| | | |
|---|---|---|
| DE | 20100840 | 1/2001 |
| DE | 19941038 | 3/2001 |
| DE | 10004072 | 10/2001 |
| EP | 927617 | 7/1999 |

* cited by examiner

Primary Examiner—Robin O. Evans
Assistant Examiner—Vinod Patel
(74) Attorney, Agent, or Firm—Clark & Brody (57) ABSTRACT

A temperature sensor for use in hot runner systems includes a resistive element which is connectable via contacting means to a control circuit for a heating device and which includes at least one element portion of larger electrical resistance than its remaining portions, preferably larger by a factor of 2 to 100. The resistive element portions may form U-shaped bows or loops or may be meandering. Two resistive tracks above one another are separated by insulating layers, e.g. ceramic dielectric layers. The resistive element portions may consist of different materials. In connection with a heating device, the temperature sensor is located on or in the body of a manifold or a nozzle, with meandering and/or bifilar heating conductors whose electrical resistance in the middle is smaller than in the top and bottom regions. The temperature sensor portion is tightly enclosed in a zone of high resistance by adjacent heating conductors. A dielectric layer may be undetachably fixed to the manifold or nozzle body and after firing, be under compressive pretension relative to the body.

24 Claims, 6 Drawing Sheets

TEMPERATURE SENSOR AND HEATING DEVICE FOR HOT RUNNER SYSTEMS

FIELD OF INVENTION

The invention relates to a temperature sensor for use in hot runner systems according to the preamble of claim 1, and a heating device for hot runner systems with a temperature sensor according to the preamble of claim 13.

BACKGROUND OF INVENTION

Hot runner systems are utilized in injection moulds to introduce a plastic compound capable of flow at a pre-specified temperature into a divisible mould body (cavity) under high pressure. A heating system is usually provided to prevent the hot compound from cooling prematurely in the distribution channels and nozzles by maintaining the fluid plastic at a constant temperature. Temperature control requirements in hot runner moulds are extremely high, as a large percentage of the plastics being processed only have a very narrow processing range and react with extreme sensitivity to temperature fluctuations, particularly in the nozzle and gate area. This means, for example, that a temperature change of only a few degrees in the nozzle area suffices to cause injection errors and leads to rejects. Precise temperature control is therefore important if a fully-automatic hot runner mould is to function correctly.

Monitoring and controlling of temperatures is normally realized by temperature sensors in the form of electrical resistive conductors (resistance sensors). These are fitted as separate elements in grooves or holes integrated in the material tube or a heating block, e.g. as disclosed in EP-A1-0 927 617 or DE-U-201 00 840. Moreover, DE-A1-199 41 038 and DE-A1-100 04 072 also indicate that both the temperature sensor and the entire heating device can be realized through use of thick-film technology, i.e., by direct coating through application on the surface of the nozzle or manifold body.

The resistance sensor generally possesses a resistance element of U-shape or meandering form and made of metal or metal alloy which alters its electric resistance if temperatures rise or fall. However, the measuring technique associated therewith has the disadvantage of being only capable of recording a mean temperature value within a relatively broad spatial range, despite the sensor being carefully positioned in the hot runner system. It is therefore difficult to achieve the necessary degree of heat control for an exact temperature distribution at or near the end of a manifold, at a nozzle tip, and the like. Particularly injection moulds, however, require exact knowledge of the temperature at the nozzle tip so that the temperature can be exactly maintained and corrected if necessary.

SUMMARY OF THE INVENTION

The task of this invention is therefore the improved recording and influencing of the temperature in selected parts of a hot runner nozzle, a manifold, or the like through the application of simple measures. The aim is, especially, to achieve variable control of the working temperature in the tip area of hot runner nozzles. Another important objective of this invention is to create a heating device for hot runner systems whose temperature can be exactly recorded within a defined range, this range being as narrowly limited as possible.

The main features of the invention are defined in claim 1 and in claim 13. Embodiments form the subject matter of claims 2 to 12 and claims 14 to 24.

With regard to a temperature sensor for use in hot runner systems with a resistance element which can be connected to an electronic control for a heating system, the invention provides, according to claim 1, that the resistance element has at least one sub-segment on its longitudinal or cross-segmental extension with a greater electric resistance than the remainder of the resistance element. This simple and cost-effective measure permits temperature recording in a manifold or a hot runner nozzle in a considerably more accurate way than previously possible.

This is due to the fact that a change of temperature in the sub-segment of the resistance element with the higher resistance has a considerably quicker and more noticeable effect than in the other parts of the resistance element. Moreover, suitably positioned temperature sensors enable particularly exact tracing of temperature development at a precisely defined position, namely, by positioning the sub-segment of the temperature sensor with the higher resistance precisely in this area of the heating system or the hot runner. Values recorded there can be evaluated with greater reliability for control of the working temperature and, consequently, the operating status of the heated element. Claim 2 also supports this, with the resistance element consisting of at least one segment and at least one sub-segment, and the electric resistance of the sub-segment being higher at a specified temperature than the electric resistance of the segment. According to claim 3, the electric resistance of the sub-segment is at least one order of magnitude higher than the electric resistance of the segment, preferably by a factor of 2 to 100. Such sensitizing of the temperature sensor means that every fluctuation in temperature leads to an immediate resistance change in the sub-segment of the thermal sensor, i.e., suitable positioning of this segment (for example, in the tip area of a hot runner nozzle) enables considerably quicker and improved temperature evaluation.

Claim 4 provides that the segment 22 and/or the sub-segment 24 form a U-shaped arc or a loop to enable optimum positioning or alignment of the sub-segment with the higher resistance. According to claim 5, both segments can also be in meandering form, thus providing a broad range of other design options.

For determining the resistance values, the geometry of the temperature sensor is preferably selected in such a way that the segment covering the majority of the length of the temperature sensor has a cross-segmental dimension greater than that of the sub-segment (as defined in claim 6). According to claim 7, practical realization of this can be achieved in a simple manner, with the segment and the sub-segment creating a resistive path of uniform thickness, and the segment being greater in width than the sub-segment.

In the embodiment of claim 8, the resistive path is a fired conductive paste. According to claim 9, however, the segment and/or the sub-segment may also be formed by at least two resistive paths arranged one above the other and divided from each other by insulating layers. This allows for the formation of practically any resistance value in low constructions. That also applies if the segment and the sub-segment are covered by or embedded in an insulating layer (as defined in claim 10), the insulating layers in the embodiment of claim 11 being ceramic dielectric coatings. The latter ensure that a lasting solid connection is established between the temperature sensor and the wall of the body being measured. Moreover, the heating system and the temperature sensor are effectively protected against moisture absorption.

Moreover, claim 12 provides that the segment and the sub-segment comprise different material compositions. This also encourages the formation of various resistance values within the resistive path, enabling spatially sensitized temperature recording.

The embodiment of the invention defined in claim 13 for which independent protection is claimed offers particular advantages. According to this embodiment, the temperature sensor is an integral part of a heating system, fitted as a measuring element on or in the manifold or nozzle body.

According to claim 14, the heating elements in the heating system are electrical heat conducting paths adapted to suit the performance requirements which can be fitted to the manifold or nozzle body in different densities and configurations, depending on the performance and the temperature distribution involved. In particular, as defined in claim 15, the heat conducting paths can at least in part be in meandering form and/or bifilar.

The development of claim 16 provides the electric resistance of the heat conducting paths in the intermediate area of the manifold or nozzle body to be lower than in the top area or in the lower end or tip area. It is therefore possible to relieve energy from the center of a manifold or nozzle body to obtain a specific temperature distribution. A concentration occurs in any case towards the ends, for example in the vicinity of the inlet or outlet of the manifold or nozzle body.

According to claim 17, the heat conducting paths form here at least one zone with a higher electric resistance than that of the remainder of the heat conducting paths, with the sensitized sub-segment of the temperature sensor penetrating into a recess of the high-resistance heat conductor zone, i.e., it can be positioned very close to the free end of the nozzle or manifold body. Temperature changes in this critical area are detected immediately, effectively enabling the avoidance of injection faults. Claim 18 also contributes in that the thermal sensor segment is surrounded by closely grouped heat conducting paths in the high-resistance zone.

In the advantageous development as defined in claim 19, the heat conducting paths are positioned on an insulating layer and covered by a further insulating layer. Moreover, claim 20 provides the temperature sensor and the heat conducting paths are positioned at the same level on the insulating layer. This means that even low constructional heights can be realized without difficulty.

According to claim 21, the heat conducting paths and the insulating layers are fired foils and/or fired thick-film pastes, with the insulating layer, at least, being a ceramic dielectric coating (as defined in claim 22). The entire heating system (along with the temperature sensor) can thus be manufactured in a simple and cost-effective manner. Moreover, the integral connection created between nozzle or manifold bodies ensures optimum heat exchange at all times.

Claim 23 also supports this, the dielectric coating being permanently applied to the manifold or nozzle body and being pre-stressed (toughened) in relation to the latter after at least one firing process. Thanks to the sheet bond thus created and the arrangement of the heating, a hot runner nozzle, to give an example, has extremely compact dimensions when compared to conventional structures while still yielding practically the same performance.

According to claim 24, an alternative is the permanent application of the dielectric coating to a base element which can be adhered to the manifold or nozzle body through thermal contact.

Other features, details and advantages of the invention will be evident from the wording of the claims and the following description of embodiments by way of the drawings wherein:

DETAILED DESCRIPTION OF THE PREFERRED EMBODIMENTS

Figure 1:
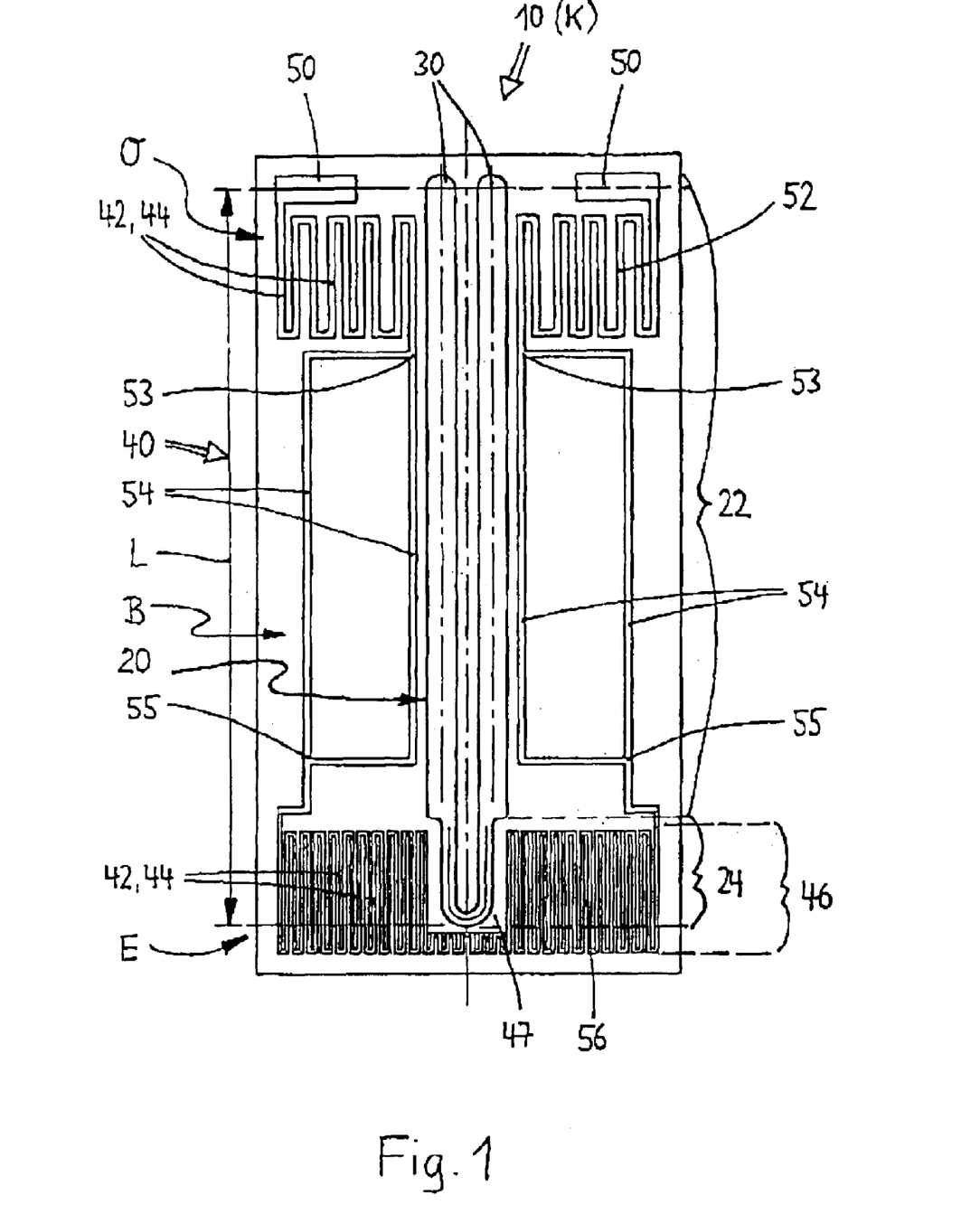
FIG. 1 is a front view of a heating device with heat conducting paths and a temperature sensor.

The temperature sensor generally designated as 10 in FIG. 1 is a component part of a heating device 40 for a hot runner system (not illustrated in detail), in particular for a hot runner nozzle (not shown, either). It has a resistance element 20 manufactured from a material which alters its electric resistance if the temperature rises or falls. This provides the basis for the recording and suitable regulation of the temperature generated by the heating device 40 via a suitable electronic control circuit (not illustrated).

Figure 2:
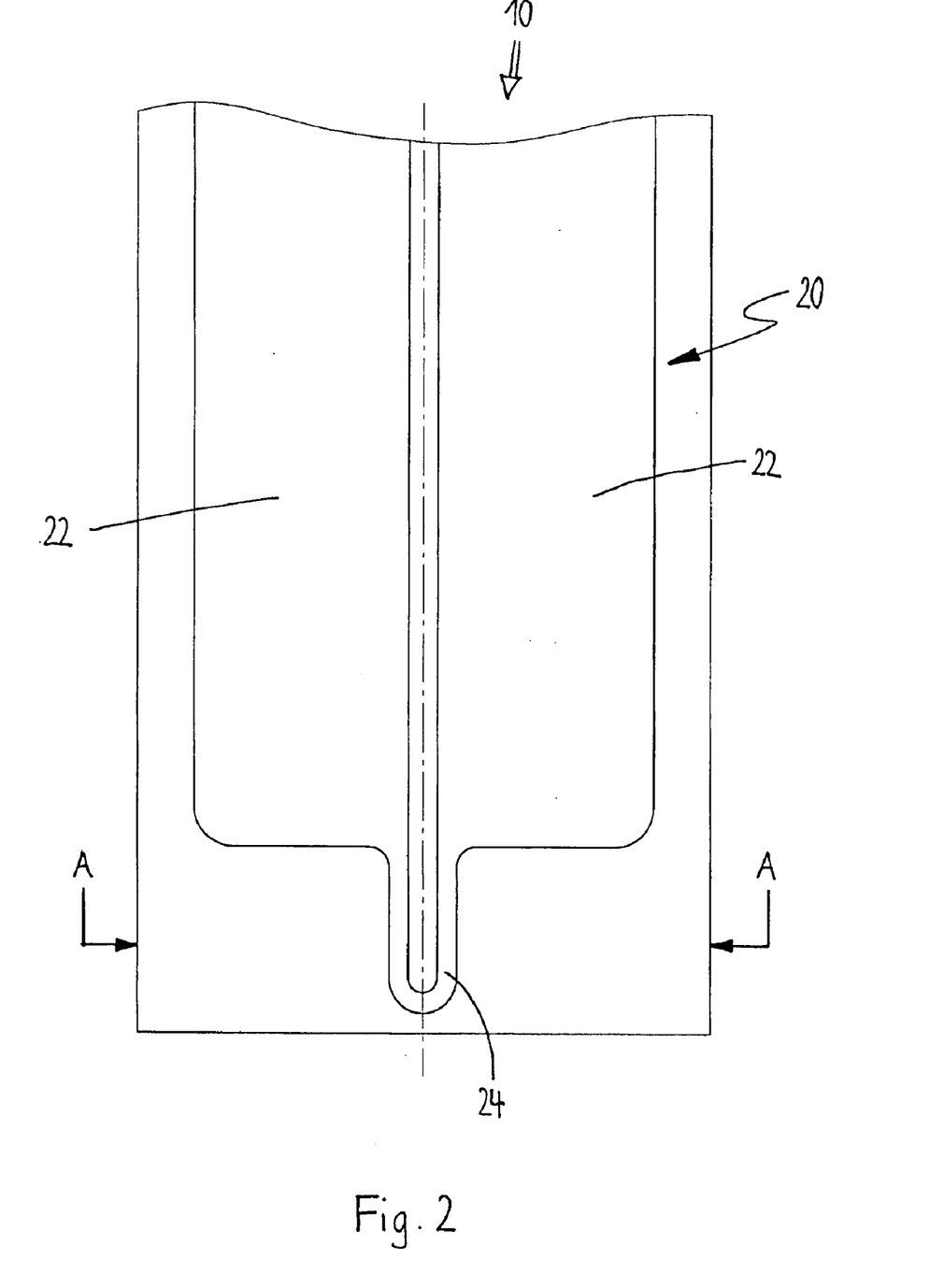
FIG. 2 is a plan view of a temperature sensor.

The resistance element 20 mainly runs longitudinally in the hot runner nozzle or the heating system 40. It is divided into three segments 22, 24, 22 which together form a relatively narrow U-shaped loop. The segments 22 form two identical resistance legs which mainly run parallel to the body K of the hot runner nozzle. They are connected at their lower ends via a sub-segment 24. The electric resistance of this sub-segment 24 exceeds the electric resistance of the segments 22 by a factor of 2 to 100 at a specified temperature. This can, for example, be realized through each segment 22 having a cross-sectional dimension which is at least twice that of the sub-segment 24. However, a preferable arrangement sees the segments 22 and the sub-segment 24 forming a U-shaped resistive path of uniform thickness. As shown in FIG. 2, its width is greater in the area of the segments 22 than in the area of the sub-segment 24. The length L of the temperature sensor 10 or the resistance element 20 is roughly equal to the length of the body K of the hot runner nozzle.

Connection contacts 30 are provided for connecting the temperature sensor 10 to the electronic evaluation and control circuit. These can e.g. take the form of solder contacts. Connection wires or cables are affixed to these solder contacts 30 which emerge via the nozzle body or a connection flange.

The heating device 40 preferably includes heating elements 42, these being electrical heat conducting paths 44. Connections 50 to a meandering ribbon 52 are located in a top section 0, for example in front of a base or a flange of the hot runner nozzle (not illustrated). The parallel heat conducting paths of the ribbon are separated from each other by a distance roughly equal to the width of an individual conducting path. The upper ribbon 52 changes at the junctions 53 to form frame-like branches or longitudinal leads 54 which run over a intermediate section B of the heating device 40 or the nozzle body K. These longitudinal leads or branches 54 converge at their lower ends 55, leading to a lower meandering ribbon 56 at the end area or the tip area E of the nozzle body K, particularly in the area of a nozzle tip (not illustrated). The width of the heat conducting paths 44 in the upper meandering ribbon 52 and in the area of the branches and longitudinal leads 54 is greater than the width of the heat conducting paths 44 in the lower meandering ribbon 56, their electric resistance consequently being higher than that in the rest of the heat conducting paths 44. The heat performance is thus concentrated in the area E of the nozzle tip(s).

Noticeable in FIG. 1 is the symmetrical arrangement of the heat conductors 42, 44, its counterpart halves surrounding the centrally positioned temperature sensor 10. This forms with its sub-segment 24 a hairpin-like loop which constitutes a particularly sensitive measuring zone. This sub-segment is surrounded by the closely configured heat conducting paths 44 of the lower meandering ribbon 56 in a recess 47 of the high-resistance heat conductor zone 46, and is thus located in the area E of the nozzle tip(s) of the hot runner whereby any temperature fluctuation in this area will have an extremely high influence on the resistance element 20.

The heat conducting paths 42, 44 of the heating device 40 are flat strips of uniform thickness, e.g. between 0.02 and 0.5 mm. They preferably consist of conductive foils or pastes fired onto an insulating layer 52 which was previously bonded to the body K of the manifold or nozzle. The insulating layer is preferably a ceramic dielectric coating, this being pre-stressed in relation to the body K of the manifold or nozzle after at least one firing process. The resistance element 20 of the temperature sensor 10 is fixed to the dielectric coating 58 using thick-film technology, too, preferably at the same level as the heat conducting paths 42, 44. The temperature sensor 10 can be of platinum or another suitable metal alloy which alters its resistance as temperatures change. A further insulating layer 59 protects the heating system 40 and the temperature sensor 10 against exterior influences. These latter form a common protective compound which can be applied to an even lateral surface or to a cylindrical jacket surface of the hot runner nozzle.

The forming and positioning of a separate sub-segment 24 of the resistance element 20 in the end area or the tip area E of the hot runner nozzle (an area sensitive to temperature changes) permits accurate and immediate recording of heat dissipation there. A deviation of the nominal temperature thus leads to a considerably quicker and more noticeable resistance change in the temperature sensor 10 of the invention than in conventional versions, i.e., deviations from the nominal temperature can be recorded rapidly and accurately, enabling immediate regulation of the heating system 40.

Figure 3:
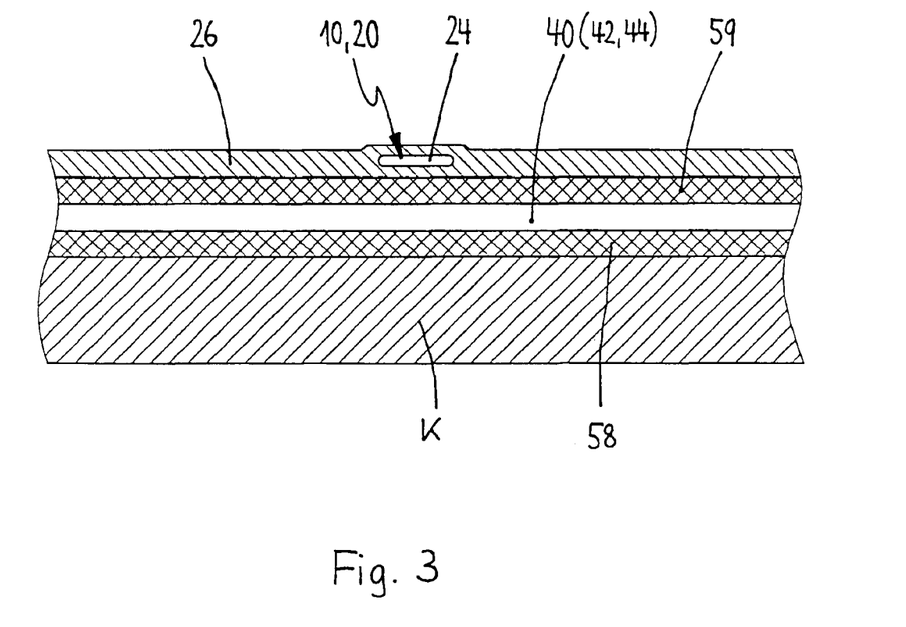
FIG. 3 is a sectional view along the line A—A in FIG. 2.

FIG. 3 shows a cross-sectional view of the temperature sensor 10 of FIG. 2. The heating system 40 is located on the outer wall of the nozzle body K. It is designed as a flat layer heating system with a ceramic dielectric coating 58 directly applied to the metal as an insulating layer, a heating layer 42 being in turn applied to this and possibly comprising heat conducting paths 44 in meandering and/or frame form (as illustrated in FIG. 1) and an outer coating 59 which covers the heat conducting paths 44 and the dielectric coating 58 below these, thus providing an exterior shield and electrical insulation. A further insulating layer 26 is applied to the outer coating 59 in which the temperature sensor 10 is embedded.

Figure 4:
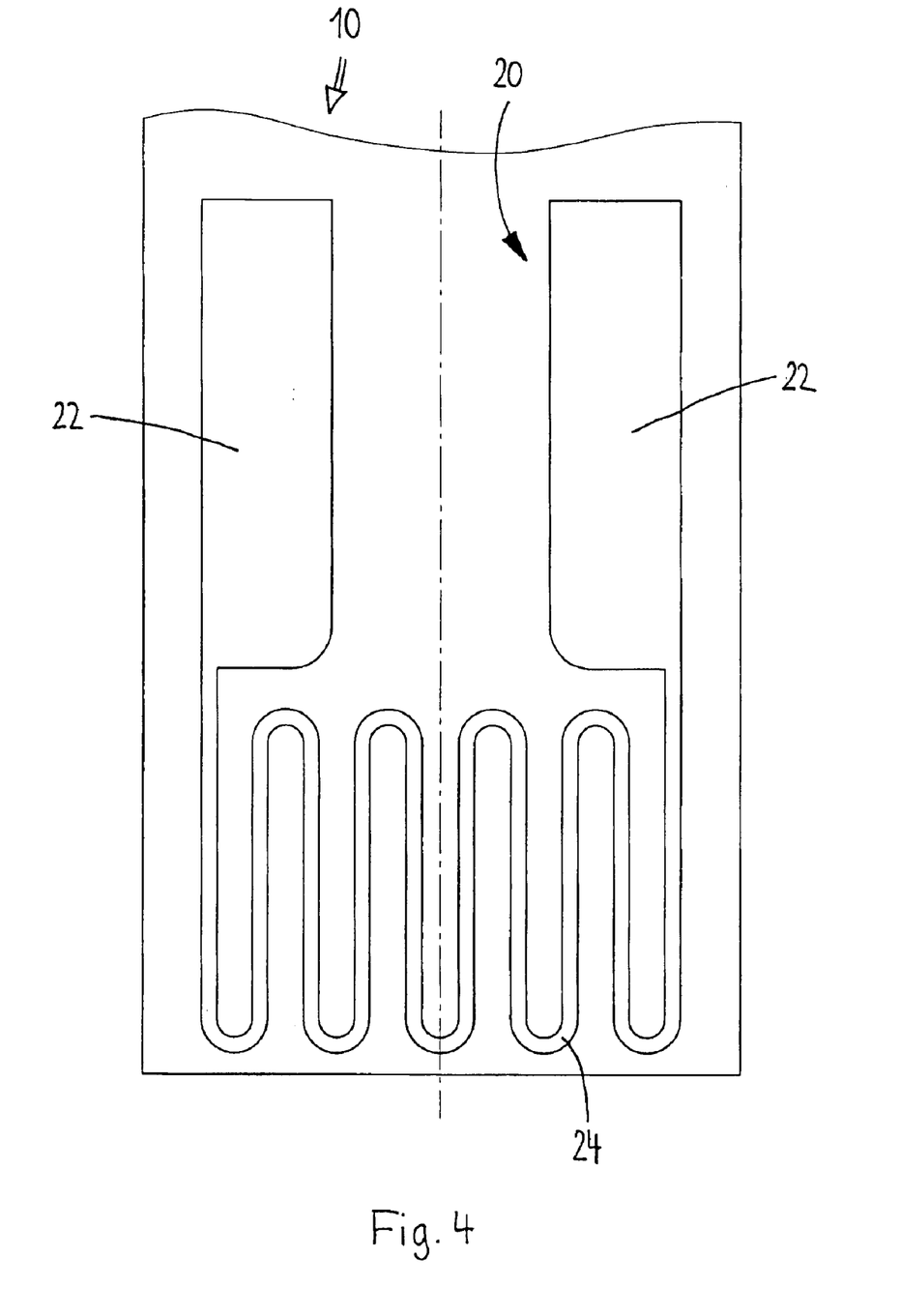
FIG. 4 is a further embodiment of a temperature sensor.
Figure 5:
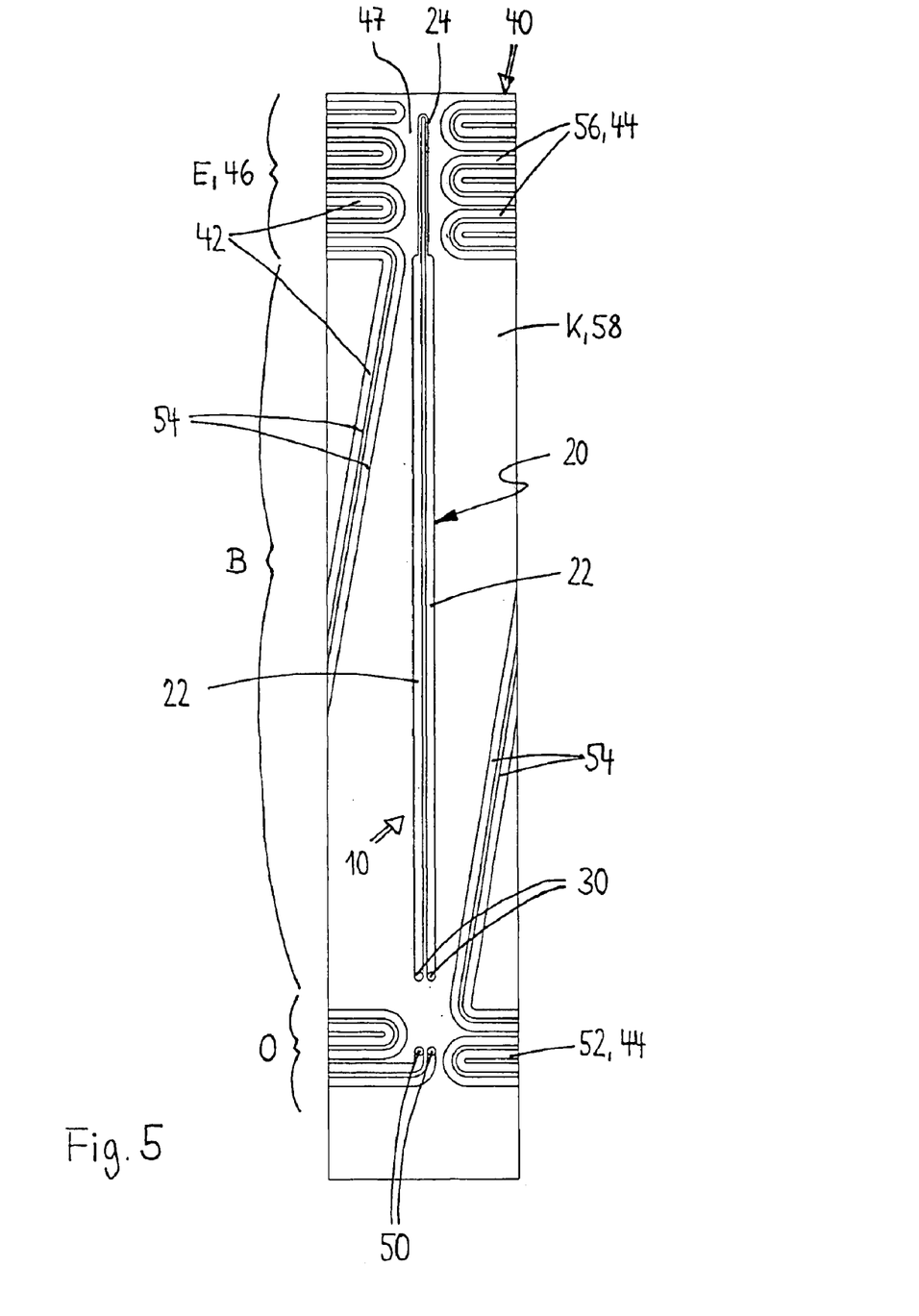
FIG. 5 is a further embodiment of a heating device with a temperature sensor.
Figure 6:
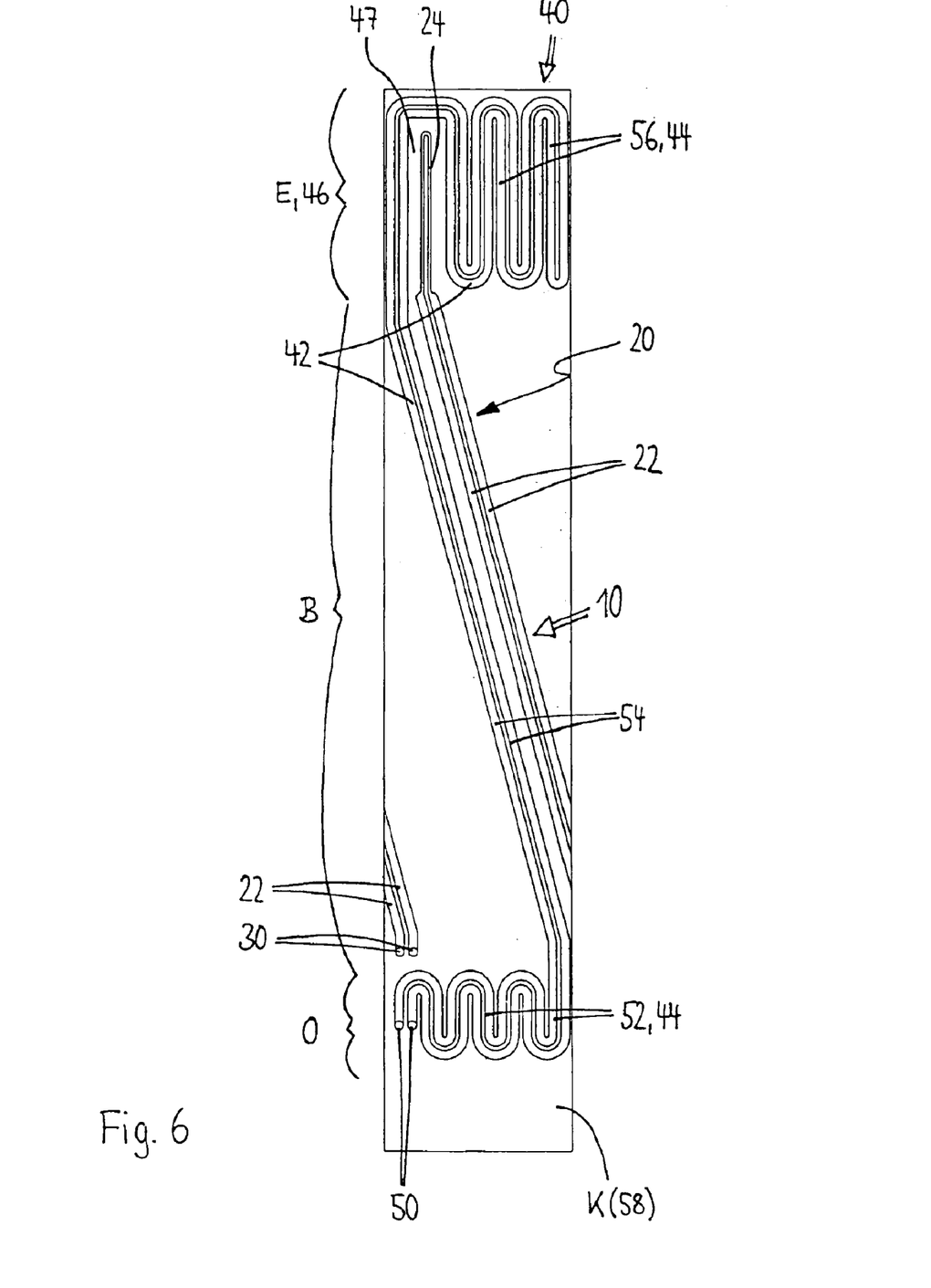
FIG. 6 is a further embodiment of a heating device with a temperature sensor.

In the embodiment shown in FIG. 4, the sub-segment 24 of the temperature sensor is in meandering shape. Here, too, it forms a particularly sensitive measuring zone, located in an area on the hot runner nozzle where its temperature is to be recorded as immediately as possible. FIGS. 5 and 6 each illustrate an alternative option in terms of both design of the heat conducting paths 44 and the arrangement and the position of the temperature sensor 10 whose measuring tip 24 is in the desired temperature measurement measuring zone at all times.

The invention is not restricted to any of the embodiments described above but can be modified in many ways. For example, the segment 22 and the sub-segment 24 of the temperature sensor 10 can be formed by two resistive paths 20 arranged one above the other and separated by thin insulating layers. This enables to achieve higher resistance values which are required, for example, for measuring higher temperatures. Here again, it is important that the resistance value of the resistance element 20 is considerably higher in the area in which temperature fluctuations should be recorded immediately and accurately than in the remaining areas of the resistive paths 20, namely by an overall factor of 2 to 100. The result is that the thermal sensor 10 will detect and influence temperature changes in the selected areas with a minimum of thermal delay.

In an advantageous development, the entire device which is suitable to be attached in an insulating manner to a conductive manifold or nozzle body, is of uniform thickness. This makes thick-film embedding both easy and reliable. The thick film can be fired utilizing a method known per se, the glass-ceramic material system containing at least one glass, glass-ceramic or ceramic component already that wets the metal surface at the respective firing temperature, converting at least in part to a crystalline state.

All the features and advantages disclosed in the claims, the description and the drawings, including design details and spatial arrangements, may be essential to the invention, both individually or in a great variety of combinations.

List of reference signs

B intermediate section
E end area/tip area
K manifold/nozzle body
L length
O top section
10 temperature sensor
20 resistance element
22 segment
24 sub-segment
26 insulating layer
30 connection contact
40 heating system/heating device
42 heating element
44 heat conducting path
46 zone
47 recess
50 connections
52 meandering ribbon
53 junction
54 longitudinal lead
55 convergence
56 meandering ribbon
58 insulating layer
59 insulating layer

What is claimed is:

1. In a hot runner system having a temperature sensor (10), the improvement comprising the temperature sensor (10) having a resistance element (20) adapted for connection to a control circuit of a heating system (40) by connection contacts (30), wherein the resistance element (20) has at least one sub-segment (24) on its longitudinal or cross-segmental extension which has a greater electric resistance than the remaining area (22) of the resistance element (20).

2. The hot runner system as defined in claim 1, wherein the resistance element (20) consists of at least one segment (22) and at lest one sub-segment (24), the electric resistance of the sub-segment (24) being greater than the electric resistance of the segment (22) at a pre-specified temperature.

3. The hot runner system as defined in claim 1, wherein the electric resistance of the sub-segment (24) is at least one order of magnitude greater than the electric resistance of the segment (22), preferably by a factor of 2 to 100.

4. The hot runner system as defined in claim 1, wherein the segment (22) and/or the sub-segment (24) form a U-shaped arc or a loop.

5. The hot runner system as defined in claim 1, wherein the segment (22) and/or the sub-segment (24) are at least in part in meandering form.

6. The hot runner system as defined in claim 1, wherein the segment (22) has a cross-segmental dimension covering the majority of the length (L) of the temperature sensor (10) which is greater than the cross-sectional dimension of the sub-segment (24).

7. The hot runner system as defined in claim 1, wherein the segment (22) and sub-segment (24) form a resistive path of uniform thickness, the width of the segment (22) being greater than the width of the sub-segment (24).

8. The hot runner system as defined in claim 7, wherein the resistive path consists of a fired conductive paste.

9. The hot runner system as defined in claim 1, wherein the segment (22) and/or the sub-segment (24) are formed by at least two resistive paths arranged one above the other, these being separated by insulating layers.

10. The hot runner system as defined in claim 1, wherein the segment (22) and the sub-segment (24) are covered by or imbedded in an insulating layer (26).

11. The hot runner system as defined in claim 9, wherein the insulating layers are ceramic dielectric layers.

12. The hot runner system as defined in claim 1, wherein the segment (22) and the sub-segment (24) have different material compositions.

13. Heating device (40) for hot runner systems with a configuration of heating elements (42) which are in thermal contact with a manifold or nozzle body (K), and with a temperature sensor (10) having a resistance element (20) adapted for connection to a control circuit of a heating system (40) by connection contacts (30), wherein the resistance element (20) has at least one sub-segment (24) on its longitudinal or cross-segmental extension which has a greater electric resistance than the remaining area (22) of the resistance element (20), and further wherein the temperature sensor (10) is a measuring element located on or in the manifold or nozzle body (K).

14. Heating device as defined in claim 13, wherein the heating elements (42) consist of electrical heat conducting paths (44) adapted to suit the performance requirements.

15. Heating device as defined in claim 13, wherein the heat conducting paths (44) are at least partially in meandering form and/or bifilar.

16. Heating device as defined in claim 14, wherein the electric resistance of the heat conducting paths (44) in an intermediate section (B) of the manifold or nozzle body (K) is lower than in the top area (O) or the end or tip area (E).

17. Heating device as defined in claim 14, wherein the heat conducting paths (44) have or form at least one zone (46) in the end area or tip area (E) of the manifold or nozzle body (K) which has an electric resistance greater than that in the remainder of the heat conducting paths (44), with the sub-segment (24) of the temperature sensor (10) penetrating into a recess (47) of the high-resistance heat conductor zone (46).

18. Heating device as defined in claim 17, wherein the thermal sensor segment (24) is surrounded by closely grouped heat conducting paths (44) in the high-resistance zone (46).

19. Heating device as defined in claim 14, wherein the heat conducting paths (44) are applied to an insulating layer (58) and covered by a further insulating layer (59).

20. Heating device as defined in claim 19, wherein the temperature sensor (10) and heat conducting paths (44) are applied at the same level to the insulating layer (58).

21. Heating device as defined in claim 19, wherein the heat conducting paths (44) and the insulating layers (26, 58, 59) consist of fired foils and/or fired thick-film pastes.

22. Heating device as defined in claim 19, wherein at least the insulating layer (58) is a ceramic dielectric layer.

23. Heating device as defined in claim 19, wherein the dielectric coating (58) is permanently applied to the manifold or nozzle body (K) and is pre-stressed (toughened) in relation to the latter after at least one firing process.

24. Heating device as defined in claim 19, wherein the dielectric coating (58) is permanently applied to a base element adapted to be adhered to the manifold or nozzle body (K) through thermal contact.

* * * * *